US007362422B2

(12) United States Patent
DiFoggio et al.

(10) Patent No.: US 7,362,422 B2
(45) Date of Patent: Apr. 22, 2008

(54) METHOD AND APPARATUS FOR A DOWNHOLE SPECTROMETER BASED ON ELECTRONICALLY TUNABLE OPTICAL FILTERS

(75) Inventors: Rocco DiFoggio, Houston, TX (US); Paul Bergren, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 206 days.

(21) Appl. No.: 10/985,715

(22) Filed: Nov. 10, 2004

(65) Prior Publication Data
US 2005/0099618 A1 May 12, 2005

Related U.S. Application Data

(60) Provisional application No. 60/518,965, filed on Nov. 10, 2003.

(51) Int. Cl.
*G01N 33/28* (2006.01)
*G01N 21/59* (2006.01)
*G01V 5/00* (2006.01)

(52) U.S. Cl. ............... 356/70; 356/436; 356/416; 356/419; 250/256; 250/261

(58) Field of Classification Search ............ 356/70, 356/416, 419, 436; 250/256, 261, 267
See application file for complete search history.

(56) References Cited

U.S. PATENT DOCUMENTS 4,490,845 A    12/1984   Steinbruegge et al.
4,994,671 A    2/1991    Safinya et al.
5,315,110 A    5/1994    Smith
5,406,082 A    4/1995    Pearson et al.
5,498,875 A    3/1996    Obremski et al.
5,541,413 A    7/1996    Pearson et al.
5,604,582 A    2/1997    Rhoads et al.
5,606,419 A *  2/1997    Foosnaes et al. ........... 356/419
6,176,323 B1   1/2001    Weirich et al.
6,388,251 B1 * 5/2002    Papanyan .................... 250/256

(Continued)

FOREIGN PATENT DOCUMENTS

GB          2217838 A    11/1989

(Continued)

OTHER PUBLICATIONS

Schupp et al., Development Of A Tunable Dode Laser Absorption Spectrometer For Measurements Of The $^{13}C/^{12}C$ Ration In Methane, Chemosphere, vol. 26, Nos. 1-4, 1993, pp. 13-22.

(Continued)

*Primary Examiner*—Richard A. Rosenberger
(74) *Attorney, Agent, or Firm*—Madan, Mossman & Sriram, P.C.

(57) ABSTRACT

The present invention provides an apparatus and method for high resolution spectroscopy (approximately 10 picometer wavelength resolution) using a tunable optical filter (TOF) for analyzing a formation fluid sample downhole and at the surface to determine formation fluid parameters. The analysis comprises determination of gas oil ratio, API gravity and various other fluid parameters which can be estimated after developing correlations to a training set of samples using a neural network or a chemometric equation.

29 Claims, 5 Drawing Sheets

U.S. PATENT DOCUMENTS

| | | | |
|---|---|---|---|
| 6,437,326 B1* | 8/2002 | Yamate et al. | 250/256 |
| 2003/0048450 A1* | 3/2003 | Pope et al. | 356/435 |
| 2003/0160164 A1 | 8/2003 | Jones et al. | |
| 2004/0045705 A1* | 3/2004 | Gardner et al. | 166/250.01 |
| 2004/0129874 A1 | 7/2004 | Torgersen et al. | |
| 2004/0145741 A1* | 7/2004 | Cole et al. | 356/436 |

FOREIGN PATENT DOCUMENTS

| | | |
|---|---|---|
| WO | WO 93/09422 A1 | 5/1993 |

OTHER PUBLICATIONS

Fiber Fabry-Perot Tunable Filter, Digital Lightwave, FFPTF 7-2002A, 2002.

Chameleon Thin Film Tunable Filter, Micron Optics CTF-TF 0302V1.

OSA-ENG TFM2000 Optical Spectrum Analyzer Engine, NP Photonics, 2002.

TFM Series High Performance Tunable Filters, NP Photonics, 2003.

NP Photonics Unveils Optical Spectrum Analyzer Engine, Sep. 16, 2002.

http://thorlabs.com, Optoelectronics, Scanning Fabry Perot, SA200-14A, retrieved Oct. 30, 2003.

The Photonics Dictionary, Book 4, 44th International Edition, 1998.

http://hyperphysics.phy-astr.gsu.edu/hbase/phyopt/fabry.html, Fabry-Perot Interferometer, retrieved Oct. 30, 2003.

Miller, Cavity-Enhanced Methods For The Detection Of Trace Air Constituents Using Continuous Wave Diode Lasers, Advanced Technology Seminar, NCAR Atmospheric Technology Division, Mar. 2003.

http://www.laser2000.co.uk/fibres/specs/specs010.htm, Laser 2000, High Performance Tunable Filters, retrieved Sep. 30, 2003.

http://www.solustech.com/solutions/technology, Introducing Compliant MEMS Technology, retrieved Oct. 30, 2003.

http://www.solustech.com/news_events/press_room/Feb_11_02.htm, Solus Micro Technology Opens U.K. Facility, retrieved Oct. 30, 2003.

\* cited by examiner

METHOD AND APPARATUS FOR A DOWNHOLE SPECTROMETER BASED ON ELECTRONICALLY TUNABLE OPTICAL FILTERS

CROSS REFERENCE TO RELATED APPLICATIONS

This patent application claims priority from U.S. Provisional patent application Ser. No. 60/518,965 filed on Nov. 10, 2003.

BACKGROUND OF THE INVENTION

1. Field of the Invention

The present invention relates generally to the field of downhole sampling of hydrocarbons and in particular to downhole and onsite surface high resolution spectroscopy of hydrocarbon samples using a tunable optical filter for measurement and estimation of physical and chemical properties of fluid from a downhole formation before, during or after sample capture in a sample chamber.

2. Background Information

In the oil and gas industry, formation testing tools have been used for monitoring formation pressures along a wellbore, obtaining formation fluid samples from the wellbore and predicting performance of reservoirs around the wellbore. Such formation testing tools typically contain an elongated body having an elastomeric packer that is sealingly urged against the zone of interest in the wellbore to collect formation fluid samples in storage chambers placed in the tool.

During drilling of a wellbore, a drilling fluid ("mud") is used to facilitate the drilling process and to maintain a pressure in the wellbore greater than the fluid pressure in the formations surrounding the wellbore. This is particularly important when drilling into formations where the pressure is abnormally high. If the fluid pressure in the borehole drops below the formation pressure, there is a risk of blowout of the well. As a result of this pressure difference, the drilling fluid penetrates into or invades the formations for varying radial depths (referred to generally as invaded zones) depending upon the types of formation and drilling fluid used. The formation testing tools retrieve formation fluids from the desired formations or zones of interest, test the retrieved fluids to ensure that the retrieved fluid is substantially free of mud filtrates, and collect such fluids in one or more chambers associated with the tool. The collected fluids are brought to the surface and analyzed to determine properties of such fluids and to determine the condition of the zones or formations from where such fluids have been collected.

One feature that most formation testing tools have in common is a fluid sampling probe. This may consist of a durable rubber pad that is mechanically pressed against the rock formation adjacent the borehole, the pad being pressed hard enough to form a hydraulic seal. Through the pad is extended one end of a metal tube that also makes contact with the formation. This tube ("probe") is connected to a sample chamber that, in turn, is connected to a pump that operates to lower the pressure at the attached probe. When the pressure in the probe is lowered below the pressure of the formation fluids, the formation fluids are drawn through the probe into the well bore to flush the invaded fluids prior to sampling. In some formation tests, a fluid identification sensor determines when the fluid from the probe consists substantially of formation fluids; then a system of valves, tubes, sample chambers, and pumps makes it possible to recover one or more fluid samples that can be retrieved and analyzed when the sampling device is recovered from the borehole.

It is desirable that only uncontaminated fluids are collected, in the same condition in which they exist in the formations. Commonly, the retrieved fluids are found to be contaminated by drilling fluids. This may happen as a result of a poor seal between the sampling pad and the borehole wall, allowing borehole fluid to seep into the probe. The mud cake formed by the drilling fluids may allow some mud filtrate to continue to invade and seep around the pad. Even when there is an effective seal, borehole fluid ( or some components of the borehole fluid) may "invade" the formation, particularly if it is a porous formation, and be drawn into the sampling probe along with connate formation fluids.

U.S. Pat. No. 4,994,671 issued to Safinya et al. discloses a device in which visible and near infrared (IR) analysis of the fluids is done in the borehole, without having to transport recovered samples of the fluid to the surface for chemical analysis. The infrared portion part of the electromagnetic spectrum (0.8 to 25 .mu.m wavelength region, or equivalently wavenumbers of 12500 to 400 $cm^{-1}$) of a substance contains absorption features due to the molecular vibrations of the constituent molecules. The absorptions arise from both fundamentals (single quantum transitions occurring in the mid-infrared region from 2.5-25.0 microns) and combination bands and overtones (multiple quanta transitions occurring in the mid- and the near-infrared region from 0.8-2.5 microns). The position (frequency or wavelength) of these absorptions contain information as to the types of molecular structures that are present in the material, and the intensity of the absorptions contains information about the amounts of the molecular types that are present. To use the information in the spectra for the purpose of identifying and quantifying either components or properties requires that a calibration be performed to establish the relationship between the absorbances and the component or property that is to be estimated. For complex mixtures, where considerable overlap between the absorptions of individual constituents occurs, such calibrations must be accomplished using various chemometric data analysis methods.

In complex mixtures, each constituent generally gives rise to multiple absorption features corresponding to different vibrational motions. The intensities of these absorptions will all vary together in a linear fashion as the concentration of the constituent varies. Such features are said to have intensities which are correlated in the frequency (or wavelength) domain. This correlation allows these absorptions to be mathematically distinguished from random spectral measurement noise which shows no such correlation. The linear algebra computations which separate the correlated absorbance signals from the spectral noise form the basis for techniques such as Principal Components Regression (PCR) and Partial Least Squares (PLS). As is well known, PCR is essentially the analytical mathematical procedure of Principal Components Analysis (PCA), followed by regression analysis.

PCR and PLS have been used to estimate elemental and chemical compositions and to a lesser extent physical or thermodynamic properties of solids, liquids and gases based on their mid- or near-infrared spectra. These chemometric methods involve: [1] the collection of mid- or near-infrared spectra of a set of representative samples; [2] mathematical treatment of the spectral data to extract the Principal Components or latent variables (e.g. the correlated absorbance signals described above); and [3] regression of these spectral variables against composition and/or property data to build a multivariate model. The analysis of new samples then involves the collection of their spectra, the decomposition of the spectra in terms of the spectral variables, and the application of the regression equation to calculate the composition/properties.

In Safinya et al. light the visible and near IR region is passed through the fluid sample. A spectrometer measures the spectrum of the transmitted and the back scattered light, and knowing the spectrum of the incident light, transmission and backscattered absorption spectra for the sample are determined. Using absorption spectra of water, gas, crude and refined oils, and drilling fluids, a least squares analysis is performed that models the observed spectra as a weighted sum of the spectra of its components, the least squares analysis giving the composition of the fluid in terms of weights of the various components.

Currently spectral analysis downhole and on site analysis for fixed single color interference filters is limited to around 11-30 nm full width at half maximum filters thus providing relatively low spectroscopic resolution. These filters are not suitable to distinguish between closely spaced spectral peaks or to identity isotopes whose spectral peak spacings are much smaller than 11 nm. Thus, there is a need for an analysis technique suitable for downhole and onsite surface spectroscopic analysis of hydrocarbon samples with high resolution.

SUMMARY OF THE INVENTION

The present invention provides an apparatus and method for onsite surface and downhole spectral analysis of hydrocarbon related samples collected downhole in an earth boring or well bore. The present invention provides a tunable optical filter (TOF) for high resolution spectroscopy (HRS) and estimation of physical and chemical properties associated with a formation fluid or gas from these HRS measurements. A sorption cooling apparatus is also provided to cool the TOF downhole if necessary. In an exemplary embodiment a TOF for HRS is provided downhole for real time HRS measurements and estimation of parameters of interest from the HRS measurements. In another embodiment HRS is performed at the surface onsite or in the tool or via a separate HRS system attached at the surface. The TOF HRS of the present invention is also useful for analysis of gases and liquids and isotopes thereof while flowing in distribution pipelines to estimate or determine the purity, grade and identity of hydrocarbons or other fluids and gases.

In one aspect of the invention exposing a system to light, the system comprising an optical filter having a first member and a second member, wherein the first member and the second member are substantially parallel and not directly in contact with one another and the formation fluid, measuring the light's interaction with the system and estimating a property of the formation fluid from the measured interaction. In another aspect of the invention a distance between the first member and the second member is modulated to select a wavelength of light. In another aspect of the invention a method of provided for exposing a second system to light, the second system comprising (a) an optical filter having a first member and a second member, wherein the first member and the second member are substantially parallel and not directly in contact with one another and (b) a secondary formation fluid, estimating a property of the secondary formation fluid, comparing the property of the formation fluid to the property of the secondary formation fluid and determining whether the formation fluid derives from the same formation compartment as the secondary formation fluid.

In another aspect of the invention an apparatus for estimating a property of a formation fluid, comprising a light source, a system in optical communication with the light source, the system comprising (a) a first member substantially parallel to a second member with which the first member is not in direct contact and (b) a formation fluid, a sensor in optical communication with the system and a processor in data communication with the sensor, wherein the processor estimates the property of the formation fluid from the sensor output. In another aspect of the invention a circuit is provided that modulates a distance between the first member and the second member. In another aspect of the invention a second system is provided comprising a) a first member substantially parallel to a second member with which the first member is not in direct contact and b) a secondary formation fluid, wherein the second system is in optical communication with the light source and the sensor, and wherein the processor compares the sensor output of the system to the sensor output from the second system in order to estimate the property of the formation fluid.

Examples of certain features of the invention have been summarized here rather broadly in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE FIGURES

For detailed understanding of the present invention, references should be made to the following detailed description of the embodiment, taken in conjunction with the accompanying drawings, in which like elements have been given like numerals, wherein.

DETAILED DESCRIPTION

Figure 1:
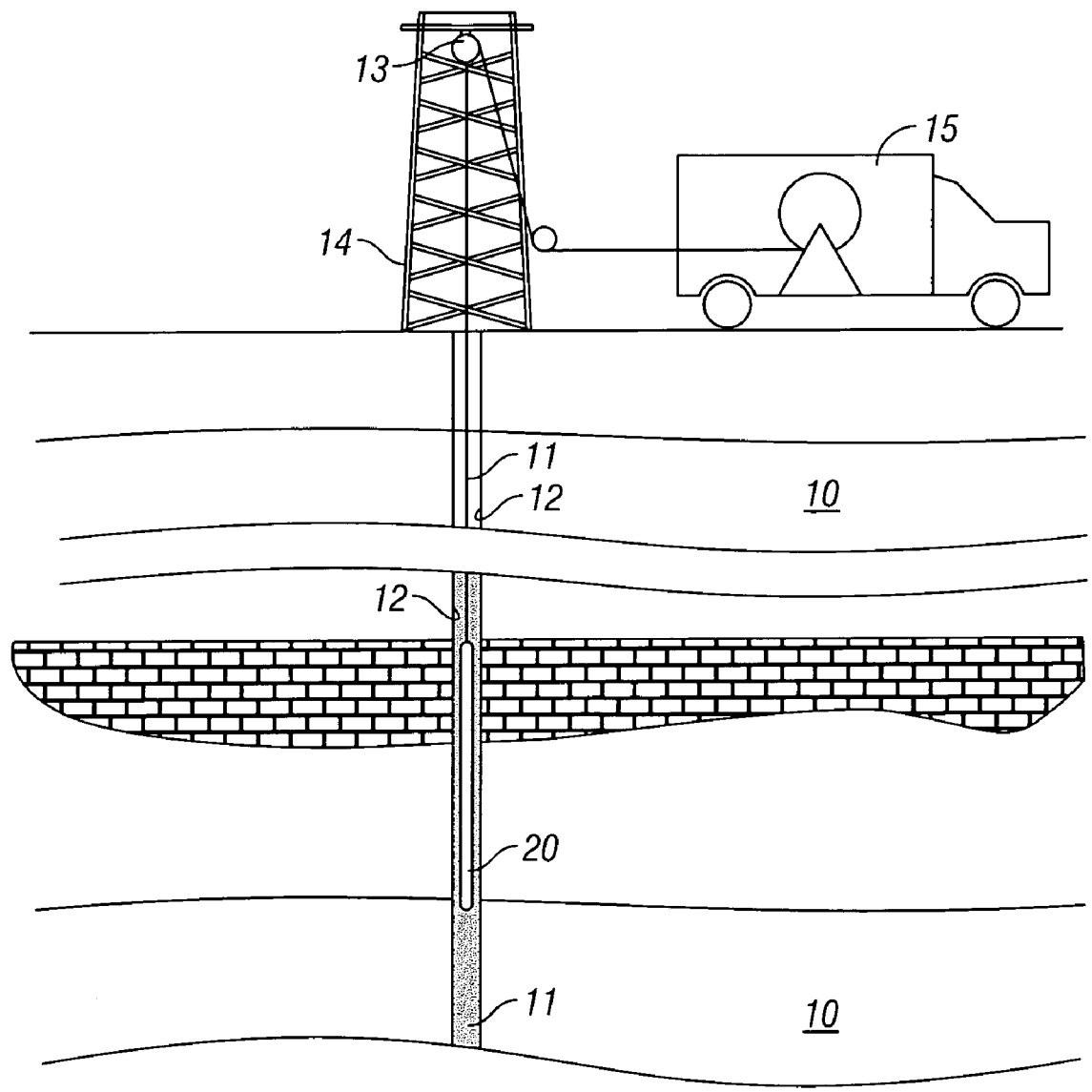
FIG. 1 is a schematic earth section illustrating the invention operating environment.

The present invention provides a tunable optical filter (TOF). The TOF can be selected from electronically tunable optical filters (currently available including Fabry-Perot, and Complaint Micro Electromechanical Systems, etc.) to collect high resolution spectra of downhole fluids to estimate or determine physical properties and composition (synthetic chromatogram), oil-based and filtrate contamination, $H_2S$, and $CO_2$ concentrations for downhole fluids. In the past, these electronically tunable filters have been primarily used by the telecommunications industry to multiplex communications. A Fabry-Perot tunable optical filter is provided in the present example of the invention. The Fabry-Perot TOF tunes the filter by changing the spacing between the sides of an etalon with a Complaint Micro Electromechanical Systems or a piezoelectric device.

The TOFs provide high wavelength resolution of 20 to 60 picometers downhole, thereby providing high resolution spectroscopy far surpassing any known downhole spectroscopy. The tunable wavelength range of TOF units has increased in recent years to 100 nanometers or more. Most of the currently-available TOF units are rated to 80° C. by their manufacturer. Thus, the present invention provides, when desired, sorption cooling or another type cooling system to overcome that temperature limitation to enable operation at downhole temperatures.

There are numerous advantages to using a rapidly tunable optical filter such as an electronically tunable one. One advantage is that the present invention uses only a single detector to accomplish HRS which in the past was not available downhole. The present invention, provides HRS for estimating parts per million of $H_2S$ in a fluid or gas. The present example of the invention provides a single detector, rather than trying to synchronize or calibrate the response of two detectors at temperature and pressure downhole or even at the surface. Furthermore, because the present invention can rapidly time or change the color transmitted by the tunable optical filter, the present invention also performs wavelength modulation spectroscopy (WMS). WMS is well known in the art and is discussed in a number of papers and texts.

The present invention uses wavelength modulation spectroscopy (WMS), to obtain the first derivative of an absorption spectrum about some center wavelength by modulating the optical filter's wavelength about that center wavelength. To calculate the change in absorbance (rather than absorbance, itself) using WMS, one no longer needs to know how much light entered the sample but only how much the transmitted light changed from its average value during the wavelength modulation. Thus, by applying WMS, the present invention collects spectra using a "single beam" instrument with as better accuracy than a known "dual beam" instrument. WMS is performed by modulating the distance between two members in the optical filter.

By definition, the absorbance A at wavelength $\lambda$ is $A(\lambda)=\log_{10}[I_0(\lambda)/I(\lambda)]$ (1)

where $I_0$ is the intensity of light entering the sample and I is the intensity of light exiting the sample. Modulating the wavelength of light from $\lambda_1$ to some nearby wavelength, $\lambda_2$, then the change in absorbance, $\Delta A$, is given by, $\Delta A=A(\lambda_2)-A(\lambda_1)=\log_{10}[I_0(\lambda_2)/I(\lambda_2)]-\log_{10}[I_0(\lambda_1)/I(\lambda_1)]$ (2)

$\Delta A=\log_{10}[I_0(\lambda_2)/I_0(\lambda_1)]-\log_{10}[I(\lambda_2)/I(\lambda_1)]$ (3)

One defines, $\Delta I=I(\lambda_2)-I(\lambda_1)$ (4)

By modulating over a spectral region where the sample's absorbance is changing rapidly with wavelength (near an absorbance peak), one can assume that the fractional change in incident (source) intensity with wavelength is small compared to the fractional change in transmitted intensity with wavelength. That is, we assume that $I_0(\lambda_2)/I_0(\lambda_1)=1$ so that the first logarithmic term of (3) vanishes. Then, substituting (4) into the remaining term of (3) to obtain, $\Delta A=-\log_{10}[(I(\lambda_1)+\Delta I)/I(\lambda_1)]=-\log_{10}[1+\Delta I/I(\lambda_1)]$ (5)

Note that $\Delta A$ now has no dependence on source intensity so one does not need a second detector to obtain the source intensity nor an optical multiplexer to shuttle between source and transmitted light impinging on a single detector. This eliminates the need for a second detector (which is very hard to exactly calibrate against the first detector, especially at extreme downhole temperatures) and eliminates the need for a multiplexer to switch between the two intensities.

Because $\Delta\lambda=\lambda_2-\lambda_1$, is very small, we can assume that $\Delta I<<I(\lambda_1)$. Then, defining $\epsilon$, $\epsilon=\Delta I/I(\lambda_1)$. (6)

Note that $\Delta I$ can be considered as an "AC" signal which is modulated by modulating $\lambda_2$ about a fixed $\lambda_1$. Similarly, $I(\lambda_1)$ can be considered as a "DC" signal at a fixed $\lambda_1$. The ratio, $\epsilon$, of "AC" to "DC" is used to calculate $\Delta A$. In this way, absorbance spectroscopy can be done without having to determine baseline light transmission through an empty sample cell.

Then, one can employ the expansion for the natural logarithm about unity, $\ln(1+\epsilon)=\epsilon-\epsilon^2/2+\epsilon^3/3-\epsilon^4/4+\ldots$ for $-1<\epsilon\leq 1$ (7)

and the identity, $\log_a(N)=\log_b(N)/\log_b(a)$ to write, $\Delta A=-[\epsilon-\epsilon^2/2+\epsilon^3/3-\epsilon^4/4+\ldots]/2.303$ (8)

Finally, one estimates the first derivative of spectrum about $\lambda_1$ as $\Delta A/\Delta\lambda=-[\epsilon-\epsilon^2/2+\epsilon^3/3-\epsilon^4/4+\ldots]/(2.303\,\Delta\lambda)$ (9)

In an alternative embodiment, there are volume phase grating technologies used by the telecommunications industry that can be used to divide up white light into fine color channels wherein each color is at a slightly different physical position. With such a device, the spectrum is read with an array of photodetectors. A MEMs mirror or other light-redirecting component is provided to electronically tune and select which color in this array of colors falls on a single detector.

The present invention provides a high-resolution spectrometer using a tunable optical filter (TOF) to enable high-resolution spectral measurements to determine or estimate physical and chemical properties of a gas or fluid, including the percent of oil-based mud filtrate contamination in crude oil samples. For purposes of the present description, high resolution spectrometry is defined as resolution of better than 10 nanometers. The present invention provides variable resolution on the order 10 nanometers to 10 picometers. The present invention also enables spectral measurements to determine or estimate the mole fraction or percent of chemical groups (aromatics, olefins, saturates) in a crude oil or gas sample. The present invention also enables high-resolution spectral measurement to determine or estimate or directly measure gas oil ratio (GOR).

The present invention provides for high-resolution spectrometry (HRS) using a TOF to enable high-resolution spectral measurement to determine or estimate the composition of a sample or to determine or estimate other parameters of interest about a sample, such as to estimate if a crude oil sample contains wet gas or dry gas ($C_1$ vs $C_2$, $C_3$, $C_4$). The present invention is also suitable for use in a pipeline, refinery or laboratory. The present invention provides a high-resolution spectrometer using a TOF to enable high-resolution spectral measurement to determine or estimate $CO_2$ in methane gas or $CO_2$ dissolved in crude oil.

The present invention provides a high-resolution spectrometer using a TOF to enable high-resolution spectral measurement to provide improved correlation of spectral measurements to physical properties (API Gravity, cloud point, bubble point, asphaltene precipitation pressure, etc.) or chemical properties (acid number, nickel, vanadium, sulfur, mercury, etc.) of crude oil $^{13}C/^{12}C$ isotopes of methane as a gas (i.e. not dissolved in a liquid).

The present invention uses the high-resolution spectrometer using a TOF to provide high-resolution spectral measurement to determine or estimate the phytane/pristane ratios of crude oil.

The present invention provides a high-resolution spectrometer using a tunable optical filter to enable high-resolution spectral measurement to determine or estimate the $H_2S$ that is dissolved in crude oil. (NIR absorbance of 100% $H_2S$ is very weak, so the absorbance of 10 ppm of $H_2S$ is even weaker). The present invention provides an high-resolution spectrometer using a TOF to enable high-resolution spectral measurement to determine or estimate the $^{17}O/^{18}O$ isotopes of water. The present invention provides a high-resolution spectrometer using a TOF to enable high-resolution spectral measurement to determine or estimate obtaining "synthetic" course-scale gas chromatograms (the envelope of $C_1$, $C_2$, $C_3$), which is the oil's carbon number distribution. The present invention provides an high-resolution spectrometer using a TOF to enable high-resolution spectral measurement to determine or estimate the $^{13}C/^{12}C$ isotopes of methane gas while it is still dissolved in liquid crude oil.

The present invention provides a high resolution TOF for spectral measurements from which a correlative equation derived from soft modeling such as least mean squares, chemometrics or a neural network to infer physical and chemical properties of sample formation fluids or other fluids, to a degree not previously thought possible by spectroscopy downhole. The present invention takes advantage of the TOF's rapid wavelength switching capability to perform high resolution derivative spectroscopy or WMS to find spectral peaks on a shoulder of another peak or to greatly improve signal to noise and makes it possible to observe subtle changes (e.g., 10-20 parts per million (ppm) $H_2S$), not previously possible downhole with lower resolution conventional mid infrared (MIR) & near infrared (NIR) spectroscopy.

TOF is provided to perform high-resolution spectroscopy. For example, it can be used to resolve the extremely subtle spectral differences between $^{13}C$ methane gas from $^{12}C$ methane gas provided that the pressure is not so high as to cause excessive pressure-broadening of these peaks to the point that they merge. The inventor is not aware of any TOF being used for high resolution spectroscopy of formation fluids.

In one example of the invention, wavelength regions such as the hydrocarbon band, $CO_2$ band, $H_2S$ band, and the $H_2O$ band are selected for HRS and WMS spectral coverage and tuning within these bands. In an exemplary embodiment, the present invention spectrally separates isotopes of liquid water or isotopes of methane when either is dissolved in crude oil or natural gas. A laboratory Fourier transform infrared (FTIR) spectrometer typically provides a 100 to 1000 times wider wavelength range but less wavelength resolution. An FTIR laboratory spectrometer typically provides a wavelength resolution of 1 $cm^{-1}$ ("wave numbers").

One can convert from wavelength resolution to wavenumber resolution by noting that, if one can resolve $\lambda_1$ from $\lambda_2$, then the wavenumber resolution is $(1/\lambda_1)-(1/\lambda_2)=(\lambda_2-\lambda_1)/(\lambda_1\lambda_2)=\Delta\lambda/(\lambda_1\lambda_2)$ where $\lambda$ are given in centimeters. Thus, for a TOF with wavelength resolution, $\Delta\lambda=20\times10^{-12}$ meters, the corresponding wavenumber resolution near the center of the hydrocarbon band at 1740 nm is $(20\times10^{-10}$ cm$)/(1740\times10^{-7}$ cm$)^2=0.066$ cm$^{-1}=0.066$ wavenumbers.

TOF spectroscopy is provided for gas analysis taking advantage of the TOF high resolution and ability to resolve the rotational splitting of the vibrational bands. In the present invention, the TOF is rapidly tuned when used for WMS spectroscopy. Thus, the TOF is useful to analyze for highly reactive systems such as free radicals, carbon clusters, ions, various reactive metal compounds, and weakly bound complexes.

Having a high temperature TOF spectrometer fabricated or combining a TOF with downhole sorption cooling or another cooling mechanism overcomes temperature issues of operating in a high temperature downhole environment. For sorption cooling, the TOF is placed in thermal contact with a source of water (either liquid or as hydrate). The TOF is cooled as the water is evaporated from liquid or released by hydrate. The resulting water vapor is sorbed by a sorbent, which becomes hotter in the process. The sorbent transfers its excess heat to the well bore fluid with which it is in thermal contact through the tool housing.

The present invention enables quantification of aromatics, olefins (unlikely in crude oil but common in OBM filtrate), saturates, methane, ethane, propane, and butane. The present invention determines or estimates the percentage of oil based mud filtrate contamination downhole, particularly if the base oil is aromatic-free (unlike crude oil) but olefin-rich (also unlike crude oil).

Furthermore, with very high resolution, the present invention determines or estimates the isotopic ratios of methane ($^{13}C$ /$^{12}C$) or isotopic ratios of water (for different oxygen isotopes) and quantifies gases such $CO_2$ (e.g., 1434 nm=6975 cm$^{-1}$, 1572 nm=6361 cm$^{-1}$, 1961 nm=5100 cm$^{-1}$, 1996 nm=5010 cm$^{-1}$, 2058 nm=4860 cm$^{-1}$) or $H_2S$ (e.g. 1313 nm=7616 cm$^{-1}$, 1578 nm=6337 cm$^{-1}$, 1934 nm=5170 cm$^{-1}$).

Alternatively, the present invention provides a set of sorption-cooled (if desired) single-wavelength (not tunable) diode lasers, each at a carefully selected wavelength, capable of performing spectroscopy at a set of predetermined fixed wavelengths.

In the present example of the invention, TOFs are provided for very high resolution spectroscopy for gas and fluids at the surface and downhole. For example, TOFs are provided to quantify one gas in the presence of many others or even to quantify different isotopes of the same gas present in a sample. In one embodiment, by changing the color (frequency) of the TOF light passed on to the sample, that is, by tuning the TOF, the present invention also performs Raman spectroscopy in combination with a single wavelength detector for the light that is Raman scattered by the sample.

One difficulty with implementing a TOF spectrometer downhole is temperature. Typically, manufacturers rate tunable optical filters to temperatures of 80° C. or less. The inventor is aware of TOFs being operated up to about 95° C.

The present example of the invention combines a tunable optical filter with a downhole sorption cooling system, when desired. The sorption cooling system cools the TOF spectrometer to assist operating the TOF at high ambient temperatures downhole while performing spectral measurements. The TOF is placed in thermal contact with a source of water (either as a liquid or as a hydrate). The TOF is cooled as water is evaporated from liquid or released by hydrate. The resulting water vapor which carries heat away from the TOF and is sorbed by a sorbent, which becomes hotter in the process. The sorbent transfers its excess heat to the well bore fluid with which it is in thermal contact.

In an exemplary embodiment, a TOF is used to perform high resolution spectroscopy (HRS) (10 picometer to 10 nanometer resolution) sweep of the 1600-1800 nm section of the hydrocarbon band which spans from about 1650-1850 nm. Other wavelength bands are swept as well depending on what elements or measurements are desired in measuring spectral transmissivity, absorbance or luminance response. From these TOF transmissivity, luminance or absorbance spectral measurements, the present invention quantifies aromatics, olefins (unlikely in crude oil but common in OBM filtrate), saturates, methane and possibly ethane, propane, and butane. With this high resolution TOF spectroscopy, referred herein as HRS, the present invention determines or estimates the percentage of oil based mud (OBM) filtrate contamination downhole in a formation fluid sample, particularly if the OBM contaminants are aromatic-free but olefin-rich. The present invention estimates the degree of formation fluid clean up or removal of contamination by monitoring a property of OBM present in a formation fluid.

Furthermore, with high resolution provided by the present invention, the present invention determines or estimates the isotopic ratios of methane ($^{13}C/^{12}C$) or isotopic ratios of water (for different oxygen isotopes) or quantifies gases such as $CO_2$ (e.g., 1434 nm=6975 cm$^{-1}$, 1572 nm=6361 cm$^{-1}$, 1961 nm=5100 cm$^{-1}$, 1996 nm=5010 cm$^{-1}$, 2058 nm=4860 cm$^{-1}$) or $H_2S$ (e.g. 1313 nm=7616 cm$^{-1}$, 1578 nm=6337 cm$^{-1}$, 1934 nm=5170 cm$^{-1}$). The primary commercial reason for determining isotopic ratios such as $^{13}C/^{12}C$ or $^{17}O/^{18}O$ is to assess the compartmentalization of a reservoir, which means to determine whether different sections of a reservoir are separate compartments (across which fluids do not flow) or whether they are connected to each other. Separate compartments must be drained separately and may need different types of processing for their fluids.

Multi-billion dollar decisions on how to develop a reservoir (well locations, types of production facilities, etc.) are based on whether or not a reservoir is compartmentalized. While a membrane can be used to separate gas from liquid to perform gas isotopic ratio analysis, it is also possible to assess compartmentalization using analysis of phytane/pristane ratios of liquid crude oil or by using any other distinguishing features such as any unexpected subtle differences in the fluid spectra that are capable of being resolved using a tunable optical filter. Gravity segregation will cause some expected spectral differences in fluids from different depths even when there is no compartmentalization. For example, one expects the top of a column of crude oil to be more gas rich than the bottom. For a 2 mm path length, the dominant liquid (C6+) hydrocarbon optical absorption peaks are near 1725 nm, while the corresponding absorbance peaks of hydrocarbon gases such as methane, ethane, propane, butane, lie between 1677 nm and 1725 nm. Subtle differences in spectra outside the regions where these hydrocarbon gases absorb are unexpected and therefore provide evidence of compartmentalization.

In another embodiment, a set of TOFs are provided to measure over a set of wavelength regions of interest corresponding to wavelengths associated with parameters of interest where each TOF is tuned over a different relevant wavelength region.

Turning now to FIG. 1, FIG. 1 schematically represents a cross-section of earth 10 along the length of a wellbore penetration 11. Usually, the wellbore will be at least partially filled with a mixture of liquids including water, drilling fluid, and formation fluids that are indigenous to the earth formations penetrated by the wellbore. Suspended within the wellbore 11 at the bottom end of a wireline 12 is a formation fluid sampling tool 20. The wireline 12 is often carried over a pulley 13 supported by a derrick 14. Wireline deployment and retrieval is performed by a powered winch carried by a service truck 15, for example.

Figure 2:
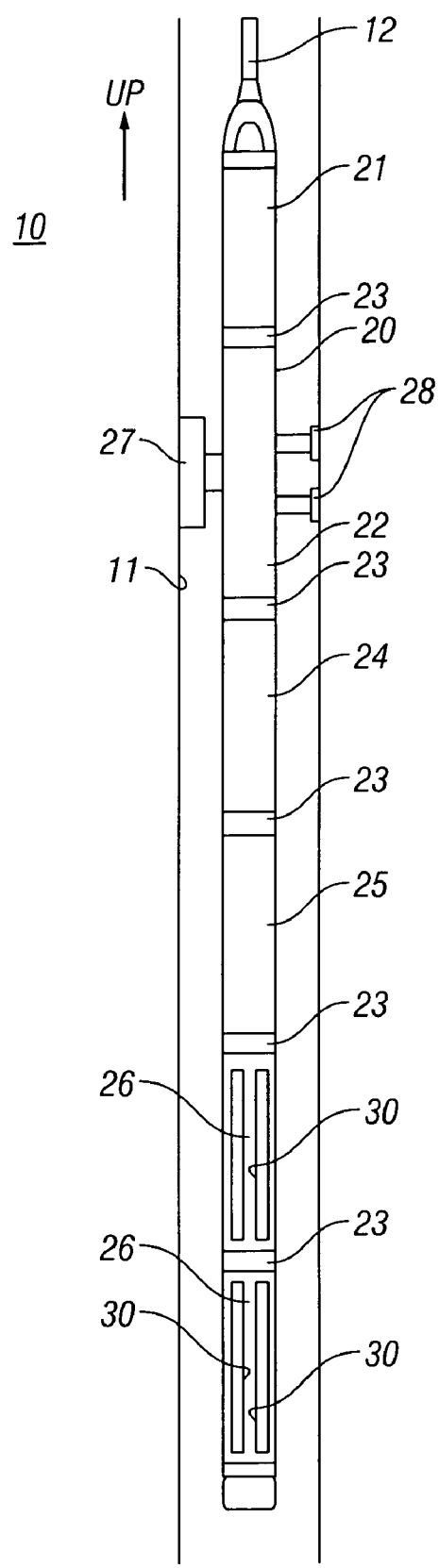
FIG. 2 is a schematic of the invention in operative assembly with cooperatively supporting tools.

Pursuant to the present invention, an exemplary embodiment of a sampling tool 20 is schematically illustrated by FIG. 2. Such sampling tools comprise an assembly of several tool segments that are joined end-to-end by the threaded sleeves or mutual compression unions 23. An assembly of tool segments appropriate for the present invention may include a hydraulic power unit 21 and a formation fluid extractor 23. Below the extractor 23, a large displacement volume motor/pump unit 24 is provided for line purging. Below the large volume pump is a similar motor/pump unit 25 having a smaller displacement volume that is quantitatively monitored. Ordinarily, one or more sample tank magazine sections 26 are assembled below the small volume pump. Each magazine section 26 may have three or more fluid sample tanks 30.

The formation fluid extractor 22 comprises an extensible suction probe 27 that is opposed by bore wall feet 28. Both, the suction probe 27 and the opposing feet 28 are hydraulically extensible to firmly engage the wellbore walls. Construction and operational details of the fluid extraction tool 22 are well known in the art.

Figure 3:
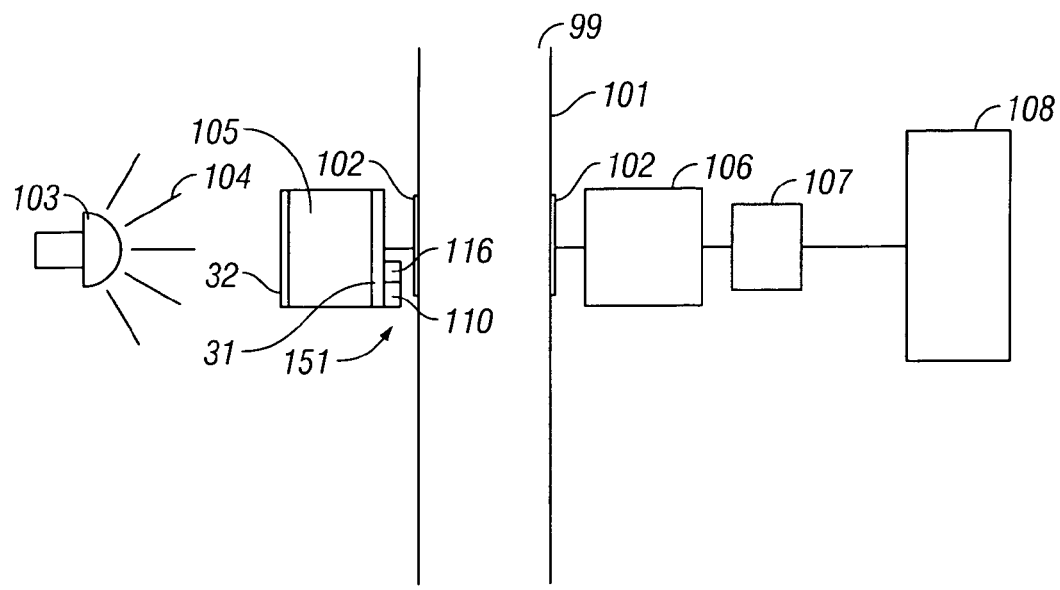
FIG. 3 is an illustration of an exemplary sample chamber and high resolution spectrometer using a tunable optical filter for analysis of a downhole formation fluid sample.

Turning now to FIG. 3, in an exemplary embodiment, a flow path to a sample chamber 101 provides one or a pair of high pressure sapphire windows 102 and a TOF high resolution spectrometer 151 for optical analysis of parameters of interest for formation fluid sample 99. The TOF high resolution spectrometer 151 comprises a light source 103 for emitting broadband light 104, a tunable optical filter 105 and a spectral light detector 106. The use of the word "light" in the example and specification is intended to include all frequencies of light including but not limited to visible, near infrared, mid infrared and ultraviolet light. The output of the spectral light detector 106 is provided to an analog to digital converter 107 for digitization and transport to a processor 108. The processor uses chemometric equations derived from a group of samples measured at high resolutions of 1 nm to 30 picometers ($3 \times 10^{-12}$ meters) wavelength resolution, which prior to the present invention was not available downhole for analysis of a sample downhole or at the surface. The derivation of these equations at such high resolution of 1 nm to 30 picometers provides new and useful analysis and determinations to be made downhole as to the content and composition, physical and chemical properties of gases and fluid at downhole temperatures and conditions.

Figure 4:
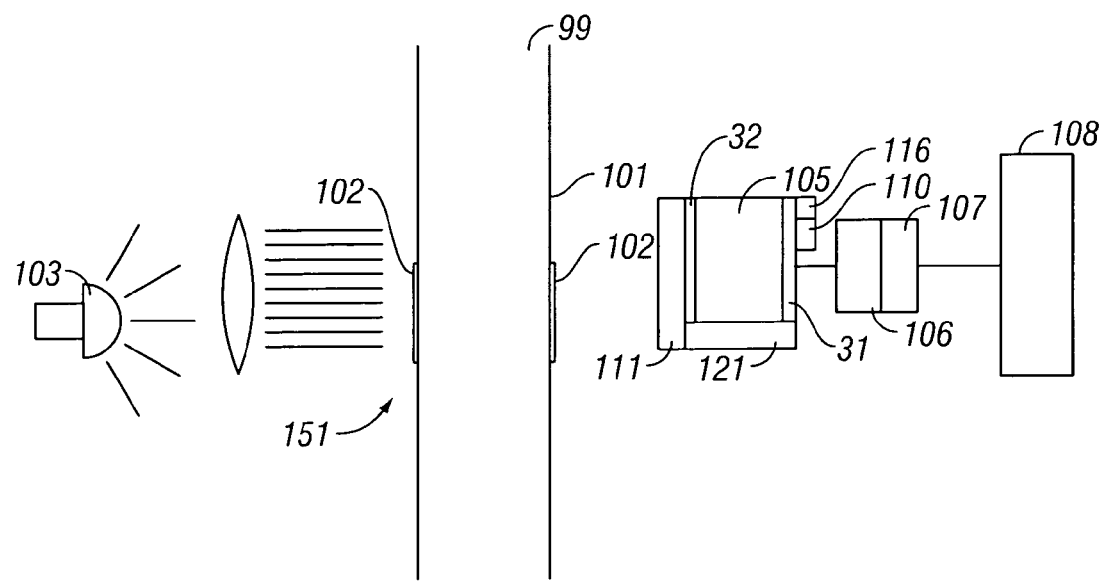
FIG. 4 is an alternative embodiment of a sample chamber and high resolution spectrometer using a tunable optical filter for analysis of a downhole formation fluid sample.

In an alternative embodiment of the present invention, as shown in FIG. 4, the tunable optical filter 105 is located on the opposite side of the sample from the light source. Thus, either post-sample or pre-sample light filtering is suitable for implementation of a tunable optical filter of the present invention. It is expected that the pre-sample filtering configuration of FIG. 3, however, will yield better results than the configuration of FIG. 4. In FIG. 4 a 100 nm band pass filter 111 is placed in front of the tunable optical filter to limit the spectrum of light to which the tunable optical filter is exposed and to avoid transmitting light at frequencies that are multiples of the intended transmitted light frequency.

The tunable optical filter is a fiber Fabry-Perot tunable filter widely available commercially which has been widely used in the communications industry for multiplexing communications over optical fiber channels. The operation of a Fabry-Perot tunable filter is discussed in U.S. Pat. No. 6,426,830 which is incorporated herein by reference in its entirety.

Figure 5:
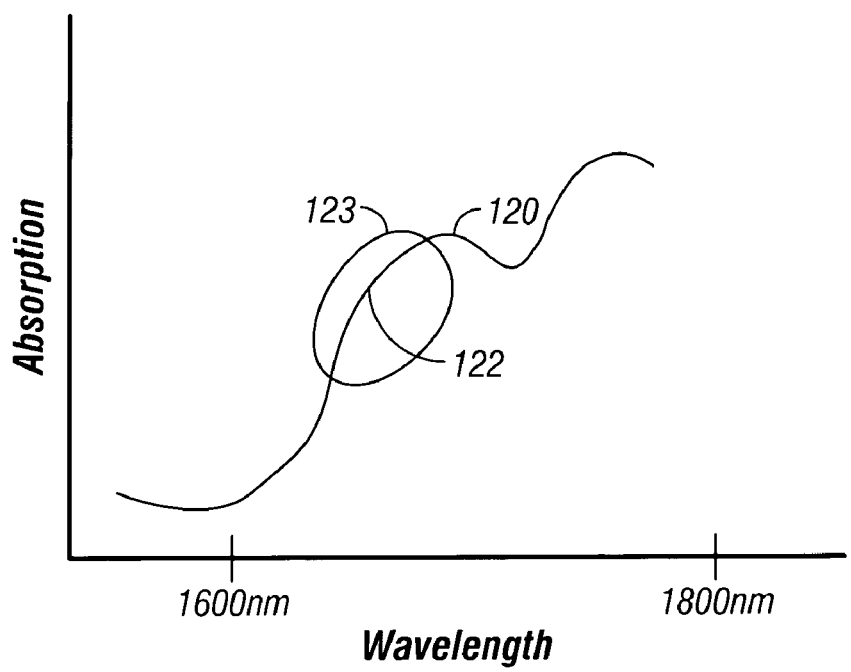
FIG. 5 is an illustration of a typical downhole spectrum showing absorbance versus wavelength.
Figure 6:
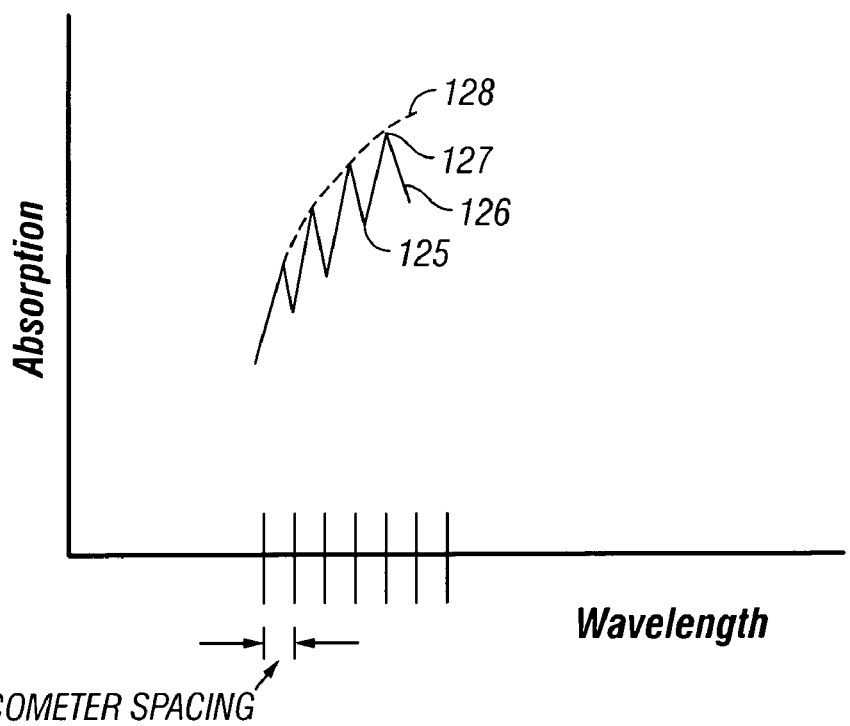
FIG. 6 is an illustration of the HRS spectrum showing a 30 picometer resolution.

Typical downhole spectrometers are relatively broad band as shown in FIG. 5. The typical downhole spectrometer covers a wavelength region of 400 nm to 2000 nm with 10 to 20 channels each of which has a band width of 10-25 nm full width at half maximum. However, typically only 1 to 3 channels cover the hydrocarbon band between 1600 nm and 1800 nm into 10-20 channels. A curve 120 of optical absorbance versus wavelength is shown in FIG. 5. A portion of segment 122 of curve 120 is encircled 123 and expanded in FIG. 6. As shown in FIG. 6, the smooth appearance of the curve 120 in FIG. 5 is actually a series 126 of closely-spaced peaks 127 and valleys 125 but not detectable at lower resolutions of the typical downhole spectrometer. The HRS of the present invention using a tunable optical filter provides a resolution of 30 picometers over a tunable wavelength of 100 nm. Thus, high-resolution chemometric correlation equations are derived with the present invention from 1 nm to 30 picometers resolution training set spectra so that HRS spectral analysis previously not possible downhole is made available by the present invention.

Using wavelength modulation spectroscopy, the peaks 127 and valleys 125 of curve 126 can be detected to obtain the slope of the absorbance curve to determine or estimate the absorbance at one or more particular wavelengths and perform compositional analysis therefrom. The slope 128 of the peaks of the curve 126 can also be detected and processed to determine or estimate the absorbance at one or more particular wavelengths and perform compositional analysis therefrom.

A sorption cooling unit 121 is provided that cools the TOF HRS if needed. The sorption cooling unit 121 is positioned adjacent the TOF HRS and other electronics downhole as necessary to obviate the adverse affects of downhole temperatures. Sorption cooling unit 121 is described in co-owned patent application ser. No. 09/756,764 filed on Jan. 8, 2001, now as U.S. Pat. No. 6,341,498, entitled "Downhole Sorption Cooling in Wireline Logging and Monitoring While Drilling" by Rocco DiFoggio, incorporated herein by reference in its entirety.

A trained neural network or chemometric equation resident in the processor 108 and developed based on a correlation between physical properties or parameters of interest for a gas or fluid and measured spectral content of a gas or fluid is used to estimate physical properties or parameters of interest (gas/oil ration(GOR), API gravity, permeability, Nuclear Magnetic Resonance relaxation time, mobility, etc.) for an unknown fluid or gas sample for which the TOF is used to measure spectral data to estimate or determine composition (chemical parameters) and physical parameters content.

Figure 7:
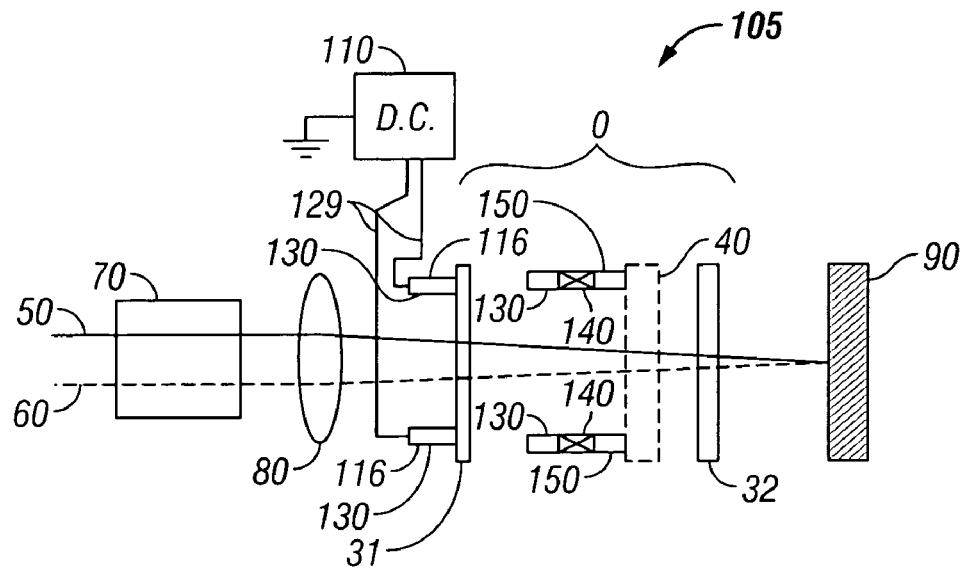
FIG. 7 is a schematic of a Fabry-Perot filter employing MEMS technology in accordance with the present invention.

Referring now to the drawings, by way of illustrative example a Fabry-Perot filter of the present invention is depicted in FIG. 7 and identified by the general reference numeral 10. Fabry-Perot filters are well-known in the optoelectronics art and, indeed, were invented over eighty years ago in conjunction with the study of optics and light physics especially as these fields developed interferometers and interferometric techniques. Hence, the general optical theory of Fabry-Perot interferometers is well understood.

Fabry-Perot filter 105 includes a first mirror 32 that is positionally fixed. A second mirror 31 that is movable and substantially optically aligned with first mirror 32 forms a cavity or etalon 40 having a length 1. The length 1 is varied in the direction of the length of cavity 40 as second mirror 31 moves transversely along the direction of length 1 when filter 105 is being tuned in accordance with the invention as discussed in greater detail below. Mirrors 31, 32 are preferably highly polished reflective mirrors which couple an input optical fiber 50 to an output optical fiber 60 through a two-fiber capillary 70 that holds the fibers 50, 60 in optical alignment with mirrors 31, 32 and mechanically holds fibers 50, 60 within filter 105.

A lens 80 is located proximate the output position of input fiber 70 and focuses light from fiber 70 onto the mirrors 31, 32 to ensure that all of the light emitted from input fiber 70 to cavity 40 is captured within cavity 40. Although lens 80 is depicted for illustrative purposes as a concave lens, other types of lenses are of course usable in filter 105 to focus the light on mirrors 31, 32 such as, for example, a convex, a planar, a circular and cylindrical lenses. As will be understood by those skilled in the art, mirrors 31, 32 are only partially reflecting which allows the cavity to be irradiated only with that desired amount of light intensity which will be multiplexed or demultiplexed by filter 105. Even more preferably, a high reflectivity mirror 90 is included in or with filter 105 at the far end of cavity 40 for coupling the input fiber to the output fiber, and for ensuring that any light which unintentionally exits cavity 40 is reflected back to the cavity so that the filter is low-loss.

In one aspect of the invention, MEMS or piezoelectric devices are disposed in contact with second mirror 31 for operatively applying forces to move or translate second mirror 31 along the lengthwise or optical axis of cavity 40 and thereby vary the length 1. MEMS and piezoelectric technology is well known to those skilled in the art. MEMS and is a process whereby micron-sized mechanical devices are fabricated on silicon wafers by photolithography and etching techniques. These mechanical devices are formed on integrated circuit chips such that devices that incorporate MEMS technology essentially become miniature electromechanical systems. MEMS devices are activated by analog voltages which create an electric field that will cause the MEMS devices to physically deflect since they are made of silicon and therefore respond to the electric field.

Accordingly, a DC power supply 110 controlled by processor 108 is connected to MEMS or piezoelectric devices 116 through leads 129 to bias MEMS devices 116 and cause transverse movement of variable mirror 31, thereby changing the length of cavity 40. One of the advantages of using MEMS devices 116 on a silicon integrated circuit chip is that these devices are low power, low voltage devices. Preferably, voltages of between about 0 and 10 volts are all that are necessary to provide the desired deflection of MEMS or piezoelectric devices 116. These low voltages ensure low attenuation of the cavity signals and low insertion losses. Applied voltages of between about 0 and 10 volts also reduce the polarization dependent loss for high signal attenuation. These results have not heretofore been achieved in the Fabry-Perot filter art. Moreover, while power supply source 110 has been shown as a DC power supply, it will be recognized by those with skill in the art that power supply 110 could alternately be an AC source with appropriate rectifying circuitry, or an AC source that directly applies power to MEMS devices 116 where MEMS devices 116 are configured for actuation by AC power. Piezoelectric technology for controlling a Fabry-Perot optical filter is also well known in the art.

MEMS devices 116 can be any kind of mechanical actuator operable to uniformly and easily move mirror 31 along cavity length 1. For example, cantilevered arms, pivot points, spring-like or other resilient mechanisms, levers, moment arms, torque generating devices, and other devices and equivalents thereof that can apply the correct amount of force to mirror 31 are all configurable in silicon MEMS devices and are within the scope of the present invention. In the currently exemplary embodiment, MEMS devices 116 are implemented by a pair of pistons 106 that are extendable to uniformly push against mirror 31 to move mirror 31 in the direction of the length of cavity 40. Pistons 106 comprise a backstop portion 130 that is physically connected to leads 129 to receive power from power supply 110. A resilient member 140 is provided to pistons 106 mechanically connected to backstop members 130 and which will move in the direction I of cavity 40 against backstop portions 130 when power is supplied from supply 110. A plunger 150 is mechanically connected to the opposite end of resilient member 140 from its connection to backstop member 130. Plunger 150 engages the surface of mirror 31 to move mirror 31 along the length of cavity 40 as force is uniformly applied by resilient member 140, as shown in phantom in FIG. 7. The dual piston MEMS system shown advantageously provides substantially equal force to the two ends of mirror 31 so that mirror 31 is uniformly advanced along the length of cavity 40.

Figure 8:
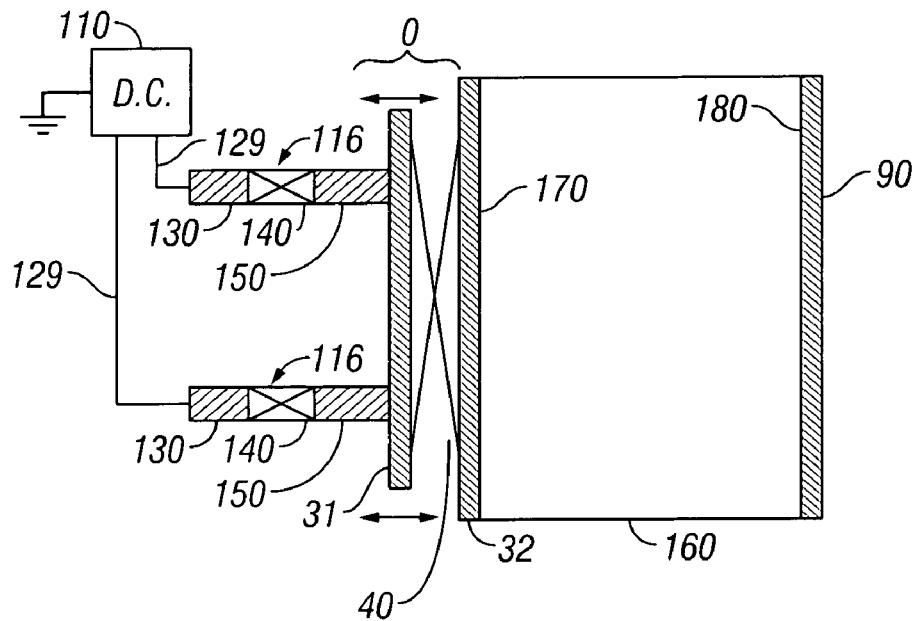
FIG. 8 is a schematic of a mirror system of the filter of FIG. 7.

Referring now to FIG. 8, a preferred construction of mirrors 31, 32 and highly reflective mirror 90 is depicted. Variable mirror 31 may comprise a metallized membrane in a silicon micro-mechanical device. A substrate 160 provides a first surface 170 on which fixed mirror 32 is formed. In the embodiment of FIG. 2, fixed mirror 32 is a metallized top of surface 170. Similarly, highly reflective mirror 90 is formed on the back surface 180 of substrate 160 by metallizing the back surface of substrate 160.

The pistons 106 operate as described above against variable mirror 31 to change the length 1 of cavity 40. Substrate 160 is preferably a silicon substrate, although it will be recognized by those skilled in the art that other substrates may be employed, such as GaAs, when it is desired to micro-machine the MEMS devices from such other substrates. In either of the embodiments of FIG. 7 or FIG. 8, it is generally desirable to polish highly reflective mirror 90 at a slight angle with respect to mirrors 31, 32 e.g. about 0.5 degrees, to make mirror 90 transparent at about 1.5 micrometers wavelength.

In another embodiment, the method of the present invention is implemented as a set computer executable of instructions on a computer readable medium, comprising ROM, RAM, CD ROM, Flash or any other computer readable medium, now known or unknown that when executed cause a computer to implement the method of the present invention.

While the foregoing disclosure is directed to the exemplary embodiments of the invention various modifications will be apparent to those skilled in the art. It is intended that all variations within the scope of the appended claims be embraced by the foregoing disclosure. Examples of the more important features of the invention have been summarized rather broadly in order that the detailed description thereof that follows may be better understood, and in order that the contributions to the art may be appreciated. There are, of course, additional features of the invention that will be described hereinafter and which will form the subject of the claims appended hereto.

What is claimed is:

1. A method for estimating a property of interest of a formation fluid downhole, comprising:
    obtaining the formation fluid at a first location downhole;
    exposing a system to light downhole, wherein the system comprises
        a) an optical filter having a first member and a second member, wherein the first member and the second member are substantially parallel and not directly in contact with one another; and
        b) the formation fluid;
    measuring the light's interaction with the system;
    estimating the property of the formation fluid from the measured light interaction; and
    recording the estimated property of the formation fluid to a tangible medium.

2. The method of claim 1 further comprising: modulating a distance between the first member and the second member to select a wavelength of light.

3. The method of claim 2, wherein modulating the distance comprises controlling a piezoelectric element.

4. The method of claim 2, wherein modulating the distance comprises controlling a micro-electromechanical device.

5. The method of claim 1 further comprising:
    estimating the property of a formation fluid obtained at a second location downhole; and
    determining from the estimated property of the formation fluid obtained at the first location and at the second location whether the formation fluid from the first location and the second location are derived from a same formation compartment.

6. The method of claim 1 further comprising modulating the optical filter to filter a plurality of wavelengths of the filtered light.

7. The method of claim 1 further comprising filtering light by the optical filter at one of (i) before exposing the formation fluid to light; and (ii) after exposing the formation fluid to the light.

8. The method of claim 1, wherein estimating the property of the formation fluid further comprises using a soft modeling technique to estimate the property of the formation fluid.

9. The method of claim 1, wherein estimating the property of the formation fluid further comprises estimating at least one of the set consisting of a: (i) carbon number distribution; and (ii) percentage of drilling mud contamination.

10. An apparatus for estimating a property of a formation fluid downhole, comprising:
    a light source that exposes the formation fluid to light downhole;
    a filter system in optical communication with the light source downhole, the filter system comprising a first member substantially parallel to a second member with which the first member is not in direct contact and a sensor in optical communication with the filter system downhole that measures light from the filter system; and
    a processor in data communication with the sensor that estimates the property of the formation fluid from an output of the sensor.

11. The apparatus of claim 10 further comprising:
a circuit that modulates a distance between the first member and the second member to select at least one wavelength of light.

12. The apparatus of claim 11, wherein the circuit further comprises a piezoelectric element that modifies the distance between the first member and the second member.

13. The apparatus of claim 11, wherein the circuit further comprises a micro-electromechanical device that modifies the distance between the first member and the second member.

14. The apparatus of claim 11, wherein the at least one wavelength comprises a plurality of wavelengths.

15. The apparatus of claim 10, wherein the light source is disposed at one of (i) a surface location in optical communication with the formation fluid downhole; and (ii) in the apparatus proximate the formation fluid downhole.

16. The apparatus of claim 10, wherein the system has a resolution substantially in a range between 10 picometers and 10 nanometers.

17. The apparatus of claim 10, wherein the processor uses the sensor output and a soft modeling technique to estimate the property of the formation fluid.

18. The apparatus of claim 10 wherein the processor estimates at least one of the set consisting of carbon number distribution and percentage of drilling mud contamination.

19. A downhole tool for estimating a property of a formation fluid, comprising:
a chamber for containing the formation fluid obtained from a formation downhole;
a light source that exposes the formation fluid in the chamber to light;
an optical filter in the downhole tool having two separated substantially parallel members, wherein the distance between the parallel members is variable, the optical filter filtering downhole light emitted by the formation fluid to obtain light of at least one wavelength;
a photodetector in optical communication with the optical filter downhole for measuring the filtered light; and
a processor in data communication with the photodetector programmed to estimate the property of the formation fluid.

20. The downhole tool of claim 19 further comprising: a circuit that adjusts the distance between the parallel members of the optical filter to filter the at least one wavelength of light.

21. The downhole tool of claim 20, wherein the circuit includes a modulator that modulates the optical filter to obtain a plurality of wavelengths of light.

22. The downhole tool of claim 19, wherein the downhole tool is conveyable into a wellbore by at least one of the set consisting of: a wireline, a slick line, a drill string and a coiled tubing.

23. The downhole tool of claim 22, wherein the optical filter further comprises a piezoelectric element that adjusts the distance.

24. The downhole tool of claim 22, wherein the optical filter further comprises a micro-electromechanical device that adjusts the distance.

25. The downhole tool of claim 19, wherein the light source is located at one of: (i) in the tool proximate the formation fluid; and (ii) at a surface location.

26. The downhole tool of claim 19, wherein the optical filter has a resolution substantially in a range from 10 picometers to 10 nanometers.

27. The downhole tool of claim 19, wherein the processor uses data from the photodetector and a soft modeling technique to estimate the property of the formation fluid.

28. The downhole tool of claim 19, wherein the optical filter is a Fabry-Perot filter.

29. The downhole tool of claim 28, wherein the spacing is adjusted by at least one of the set consisting of a piezoelectric element and a micro-electromechanical device.

* * * * *

UNITED STATES PATENT AND TRADEMARK OFFICE
CERTIFICATE OF CORRECTION

| | |
|---|---|
| PATENT NO. | : 7,362,422 B2 |
| APPLICATION NO. | : 10/985715 |
| DATED | : April 22, 2008 |
| INVENTOR(S) | : Rocco DiFoggio and Paul Bergren |

It is certified that error appears in the above-identified patent and that said Letters Patent is hereby corrected as shown below:

Column 16, line 34, delete the word "spacing" and insert --distance--.

Signed and Sealed this

Twenty-fourth Day of June, 2008

JON W. DUDAS
*Director of the United States Patent and Trademark Office*